This invention relates to bread wrapping, and more particularly to the end fold of the wrapper about a loaf of bread.

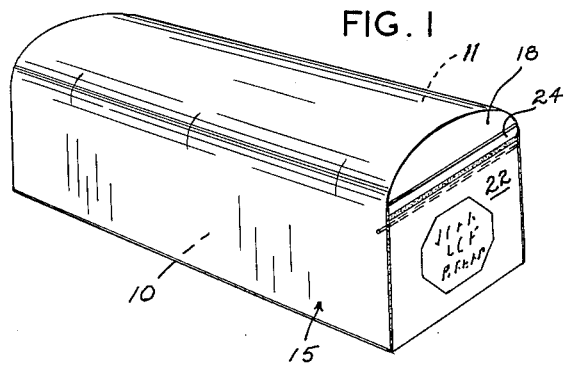
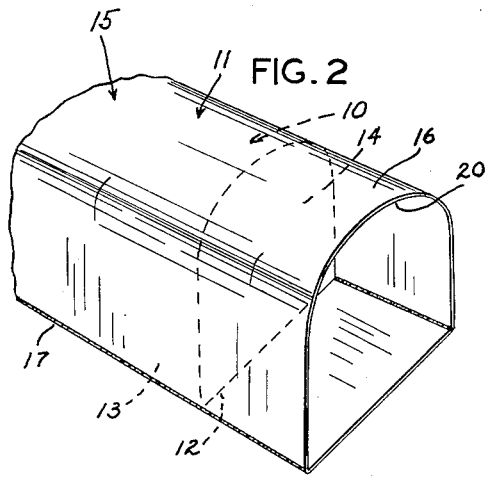
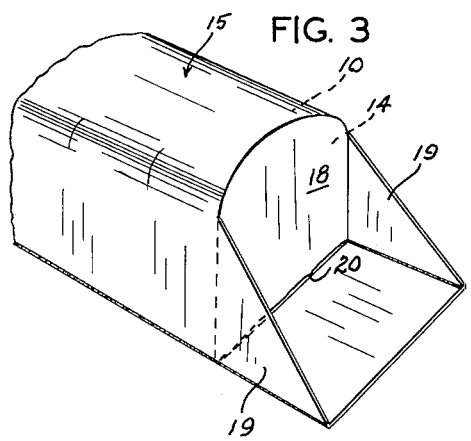
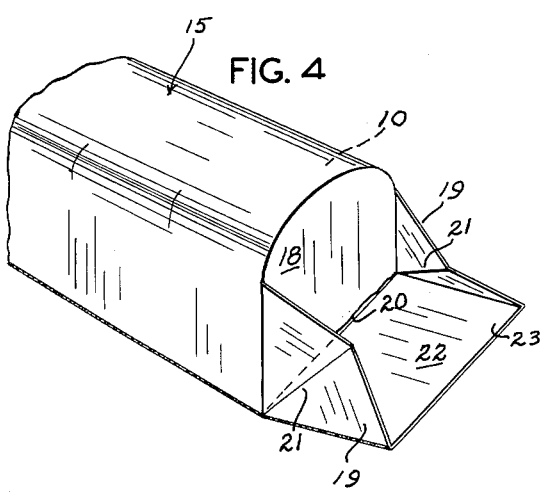
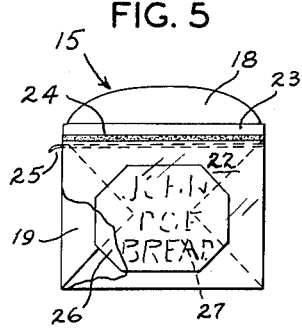
INVENTOR
DONALD W. HANSON
ATTORNEY 3,067,040
BREAD PACKAGE
Donald W. Hanson, Northfield, Minn., assignor to G. T. Schjeldahl Company, Northfield, Minn., a corporation of Minnesota
Filed Aug. 17, 1959, Ser. No. 834,085
5 Claims. (Cl. 99—172)

Conventional bread wrappings have ends usually doubled over in progressive folds which are secured together by adhesive or by melting a surface coating of the wrapper, as in the case of waxed paper. End folds of this nature do not lend themselves to advertising or identification purposes because the area is broken up into several folded flaps and, even when the material is transparent, the folds and creases interfere with the viewing of imprinted material or inserts which may be slipped behind the transparent sheet. Furthermore, such folds do not lend themselves to use with sheet thermoplastic material because appropriate adhesives for such material are generally objectionable from the standpoint of food contamination, and the material at the doubled folds becomes destroyed from the heat before they properly seal through the multiple thickness.

It is within the contemplation of the present invention, and a general object thereof, to overcome the above noted disadvantages and to provide an end fold for bread wrappings which will present an outer single thickness capable of constituting a panel for imprinting material thereon or, when transparent, for viewing inserts inserted thereunder.

Another object of the invention is to provide an end fold adaptable for use with thermoplastic sheet material which can be simply and effectively heat-sealed without the use of adhesives or surface coatings.

A further object of the invention is to provide a sealed end fold structure which can be opened without destroying the closable characteristics of the wrapper to maintain bread in fresh condition as slices are periodically removed therefrom.

These and other objects and advantages of the invention will more fully appear from the following description, made in connection with the accompanying drawing, wherein like reference characters refer to the same parts throughout the several views and in which:

FIGURE 1 is a perspective view showing a loaf of bread wrapped in acordance with my invention;

FIGURE 2 is an end segment of the bread loaf showing the tubular sheet material in position before folding over the end;

FIGURE 3 is a view similar to FIGURE 2, showing the inner panel folded against the loaf end;

FIGURE 4 is a similar view showing the beginning of the final fold; and

FIGURE 5 is an end view of the completely wrapped bread with an insert visible through the outer panel.

With continued reference to the drawing, FIG. 1 shows a completely wrapped loaf of bread in accordance with my invention, and FIGS. 2–4 show progressively the end fold which is completed as viewed in FIG. 5. The loaf of bread is indicated at 10 and may constitute a conventionally shaped loaf of bread having a somewhat rounded top 11 and a substantially flat bottom 12, as shown. My invention is particularly adaptable to rectangular loaves of bread known as "sandwich loaves" but, because of its general application, is shown in conjunction with the more difficult rounded-type loaf.

The loaf of bread 10 has vertical areas 13 which, together with the top and bottom areas 11 and 12, constitute the side wall areas of the bread. End walls 14 constitute the particular portions of the bread loaf 10 which are to be wrapped in accordance with the present invention.

The wrapper which I employ is indicated generally at 15 and surrounds bread loaf 10 closely at the side areas with an excess length 16 projecting beyond the end 14 of loaf 10 for the purpose of forming the end fold structure. My end fold finds utility with any conventional bread wrapping sheet material which can be imprinted and sealed and, further, is applicable to use with thermoplastic sheet material such as polyethylene. Special advantage is obtained where the sheet material is transparent, which will be subsequently pointed out. For purposes of illustration, I have employed thermoplastic sheet material of a transparent nature, the tubular formation being achieved by sealing together thermoplastic sheets at the lower side edges 17, or by any other method of wrapping and joining edges longitudinally to effect the tubular wrap with the excess length 16, as shown in FIG. 2.

The excess wrapper portion 16 is pressed downwardly against the loaf end 14 to produce an inner panel 18 as shown in FIG. 3. Slight distortion of the sheet material and the bread will permit the inner panel 18 to lie virtually flat against the end 14 and offers no problem in the subsequent folding and sealing operation. In folding the inner panel 18 inwardly, triangular side panels 19 are formed and these panels constitute a double thickness of the sheet material. The excess length 16 of the tubular sheet wrapper 15 may be conveniently formed of such length that the outer edge 20 thereof coincides closely with the plane of the bottom edge 12 of loaf 10.

With the side panels 19 formed as shown in FIG. 3, they are next folded inwardly along fold lines 21 and raising the outer panel 22 in such a manner as to overlie the redoubled side panels 19 and also to lie flat against the inner panel 18. When folded in this manner, the outer panel 22 presents a single thickness over the greater portion of the end 14 of bread loaf 10. There are no folds in this outer panel and there need be but a minimum of wrinkling in the formation of the end fold. Furthermore, it will be noted that the side panels 19 in their redoubled condition angulate upwardly and outwardly toward the side edges of the bread loaf 10 so as to expose a maximum area of the inner panel 18 at the location of contact of the upper margin 23 of outer panel 22. This feature is quite important in effecting a good heat seal with thermoplastic material so as to avoid the necessity of adhesive material or special sealing coatings. In addition, when the wrapper material 15 is composed of a thin thermoplastic sheet such as polyethylene, only a momentary contact of a heated instrument is necessary to form seal line 24 which will bond virtually all of the upper margin 23 of the outer panel 22 to the inner panel 18. It is understood, of course, that a duplicate end fold may be made at the other end of the loaf and the folding and sealing procedure may be simultaneously performed at each end.

A tear strip 25 may be conveniently placed just below the seal line 24 so as to sever the outer panel 22 from its upper margin 23 when it is desired to open the wrapper 15. Even after being opened in this manner, the excess wrapper material 16 will surround the end 14 of bread loaf 10 and may be twisted shut as the bread is progressively used up to prevent the remainder from drying. The wrapper material 15 may be made from any of the commercial sheet materials composed of thin and flexible thermoplastic substance if it is desired to heat-seal the wrapper and its end fold. I have also found it convenient to utilize so-called "linear" thermoplastic sheeting in which the ease of tearing is substantially greater in one direction than at 90° thereto. In the instant case, the linear fiber orientation extends circumferentially of the loaf of bread and longitudinally of the tear strip 25.

As previously noted, the large, flat and single thickness of the outer panel 22 lends itself to imprinting which may be done either before or after the wrapper is applied to the bread. Where the wrapper is constructed of transparent material, the outer panel 22 may directly overlay an insert 26 upon which imprinted material 27 may appear. Such written material can, of course, be easily viewed through the single thickness of transparent material in panel 22.

It will, of course, be understood that various changes may be made in the form, details, arrangement and proportions of the parts without departing from the scope of the invention as set forth in the appended claims.

What is claimed is:

1. A wrapped bread structure comprising, a loaf of bread having side wall areas and end wall areas, a tubular sheet wrapper surrounding closely the side wall areas and having excess length extending beyond the side wall areas, an end fold structure formed of said excess length and having an inner panel of single thickness folded downwardly against an end area of the loaf, side panels folded inwardly against said inner panel and an outer panel of single thickness folded upwardly in overlying contact with said side panels and said inner panel, said outer panel having a horizontal upper margin extending substantially the width of said loaf of bread and parallel side edges substantially in registry with those of the inner panel, and a heat sealed juncture between the upper margin of said outer panel and the inner panel, said juncture being formed in a straight horizontal line continuously across the width of said inner and outer panels.

2. A wrapped bread structure comprising, a loaf of bread having side wall areas and end wall areas, a tubular sheet wrapper surrounding closely the side wall areas and having excess length extending beyond the side wall areas, an end fold structure formed of said excess length and having an inner panel of single thickness folded downwardly against an end area of the loaf, a pair of doubled triangular panels respectively at the sides of said end area, said doubled triangular panels being again doubled inwardly to lie flat against said inner panel, and an outer panel of single thickness folded upwardly in overlying contact with said triangular panels and with said inner panel, said outer panel having a horizontal upper margin extending substantially the width of said loaf of bread and parallel side edges substantially in registry with those of the inner panel, and a heat sealed juncture between the upper margin of said outer panel and the inner panel, said juncture being formed in a straight horizontal line continuously across the width of said inner and outer panels.

3. A wrapped bread structure comprising, a loaf of bread having side wall areas and end wall areas, a tubular sheet wrapper of transparent material surrounding closely the side wall areas and having excess length extending beyond the side wall areas, an end fold structure formed of said excess length and having an inner panel of single thickness folded downwardly against an end area of the loaf, a pair of side panels folded inwardly and lying in spaced relation against said inner panel and an outer panel of single thickness folded upwardly in overlying contact with said side panels, a heat sealed juncture between the upper margin of said outer panel and the inner panel and extending substantially the width of said loaf of bread, and a sheet insert underlying said single thickness outer panel in unobstructed view, said juncture being formed in a straight horizontal line continuously across the width of said inner and outer panels.

4. A wrapped bread structure comprising, a loaf of bread having side wall areas and end wall areas, a tubular sheet wrapper constructed of thermoplastic sheet material surrounding closely the side wall areas and having excess length extending beyond the side wall areas, an end fold structure formed of said excess length and having an inner panel of single thickness folded downwardly against an end area of the loaf, a pair of side panels folded inwardly against said inner panel and an outer panel of single thickness folded upwardly in overlying contact with said side panels and said inner panel, said outer panel having a horizontal upper margin, extending substantially the width of said loaf of bread and a continuous elongated heat-seal juncture formed in a straight line completely across and between the upper margin of said outer panel and said inner panel, said heat-sealed juncture being effected substantially entirely through single thicknesses of the panels joined.

5. A wrapped bread structure comprising, a loaf of bread having side wall areas and end wall areas, a tubular sheet wrapper surrounding closely the side wall areas and having excess length extending beyond the side wall areas, an end fold structure formed of said excess length and having an inner panel of single thickness folded downwardly against an end area of the loaf, a pair of side panels folded inwardly and lying in spaced relation against said inner panel and an outer panel of single thickness folded upwardly in overlying contact with said inner panel and said side panels, said outer panel having a horizontal upper margin, extending substantially the width of said loaf of bread, a heat sealed juncture between the upper margin of said outer panel and said inner panel, and a tear strip located closely below said sealed juncture and interposed between the outer panel and the inner panel whereby to easily tear the single thickness of said outer sheet when pulled, said juncture being formed in a straight horizontal line continuously across the width of said inner and outer panels.

References Cited in the file of this patent

UNITED STATES PATENTS

| | | |
|---|---|---|
| 1,824,884 | Glenn et al. | Sept. 29, 1931 |
| 1,981,073 | Rose | Nov. 20, 1934 |
| 2,092,149 | Berkowitz | Sept. 7, 1937 |
| 2,099,301 | Hamersley et al. | Nov. 16, 1937 |
| 2,157,898 | Hohwart | May 9, 1939 |
| 2,441,513 | Schmitt | May 11, 1948 |
| 2,489,726 | Salerno | Nov. 29, 1949 |